T866035

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1439

866035

822,017

CYCLIC DIONES AS EMULSION STABILIZERS AND ANTIFOGGANTS

Dorothy J. Beavers, % Kodak Park Division, Rochester, N.Y. 14650

Filed May 5, 1969. Published Sept. 30, 1969
Int. Cl. G03c *1/34, 1/86*
U.S. Cl. 96—85
No Drawing. 10 Pages Specification The stabilization against fog of photographic silver halide emulsions and elements is obtained through the use of cyclic diones wherein there are four carbon atoms in the ring. The stabilizing compounds contain at least one radical or atom selected from the group consisting of hydroxy, alkoxy and halogen. The useful compounds are represented by the following structural formulas:

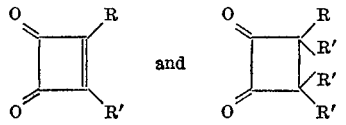

wherein each R can be hydroxy, alkoxy or halogen and each R' can be hydrogen, alkyl, aryl, hydroxy, alkoxy or halogen. A useful range for the concentration of the stabilizer is from about 0.5 gram to about 20 grams per mole of silver halide. Examples of suitable compounds include 3,4 - dihydroxy - 3 - cyclobutene - 1,2 - dione, 3 - methoxy-4 - phenyl - 3 - cyclobutene - 1,2 - dione, 3 - hydroxy - 4-phenyl - 3 - cyclobutene - 1,2 - dione, 3,4 - diethoxy - 3-cyclobutene - 1,2 - dione, 3,4 - diethoxy - cyclobutane - 1,2-dione, 3 - bromo - 4 - phenyl - 3 - cyclobutene - 1,2 - dione, and 3,4-dihydroxycyclobutane-1,2-dione.

Photographic silver halide emulsions and elements stabilized as described can be chemically sensitized, e.g., with noble metal sensitizers alone or in combination with sulfur or selenium sensitizers. They can contain spectral sensitizers, incorporated color forming couplers, incorporated developing agents, other antifoggants, hardeners, plasticizers, coating aids, and other suitable photographic addenda, such as described in U.S. Patent 3,297,446 (columns 4–9).